Aug. 10, 1948.    G. E. BURKS    2,446,631
LIQUID COLLECTING AND DIRECTING MEANS
Filed Sept. 1, 1944    2 Sheets-Sheet 1
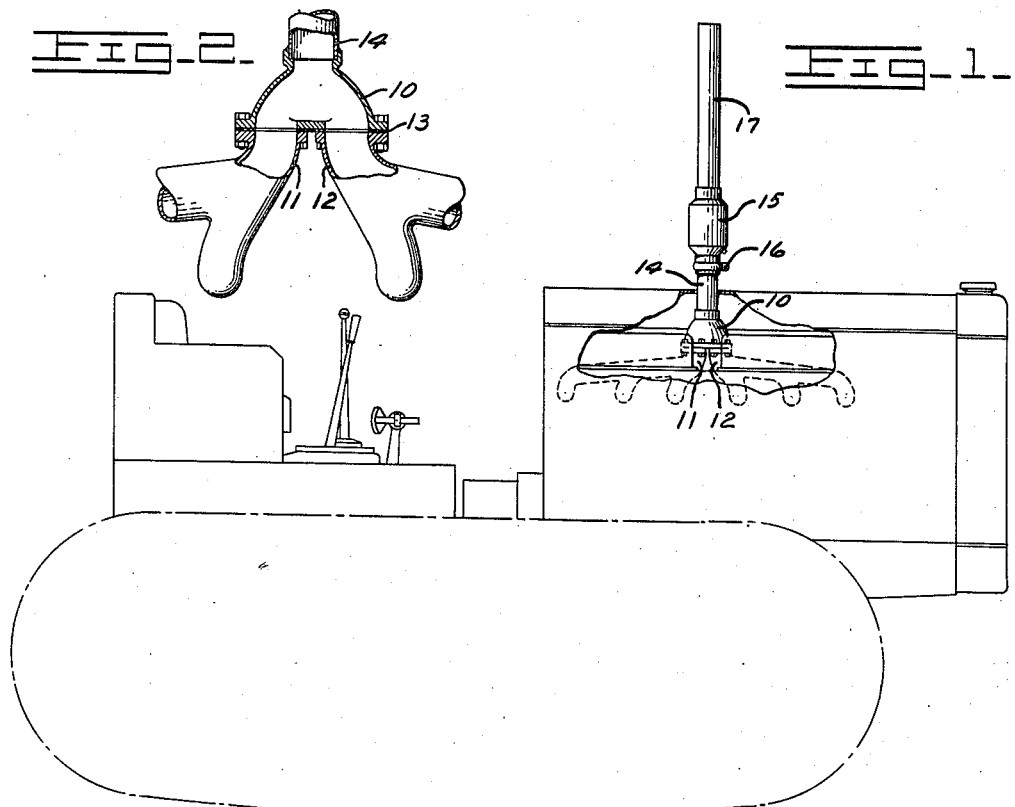
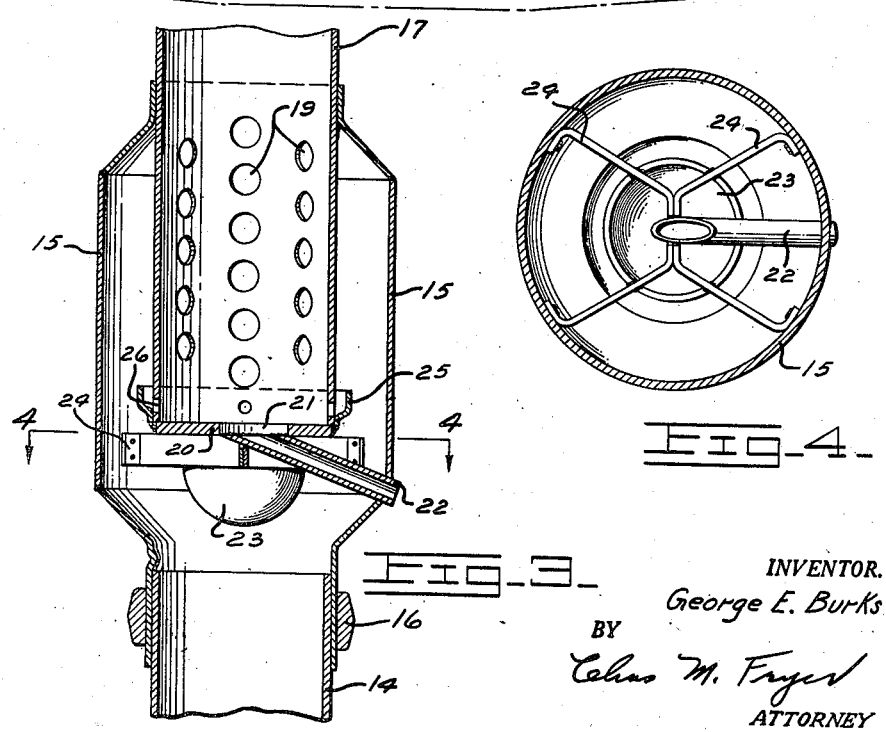
INVENTOR.
George E. Burks
BY
ATTORNEY

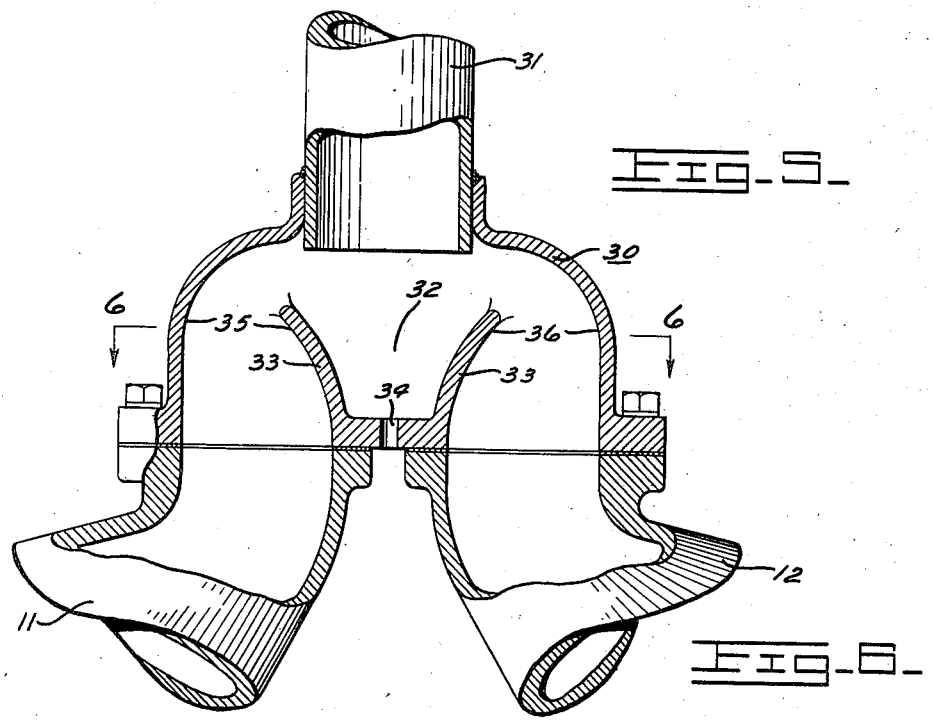
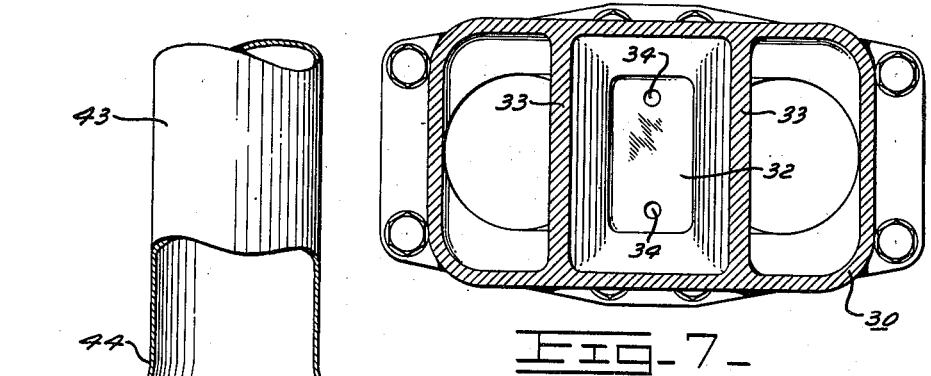
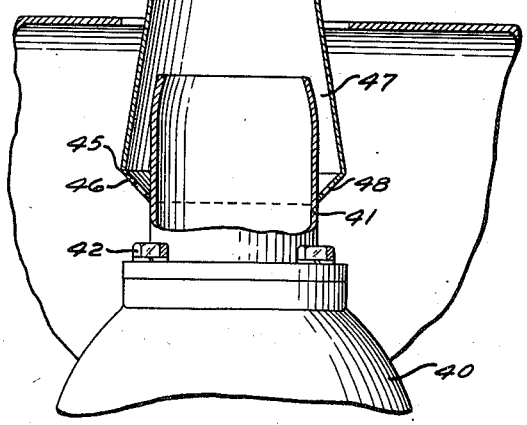
INVENTOR.
George E. Burks

Patented Aug. 10, 1948

2,446,631

UNITED STATES PATENT OFFICE 2,446,631

LIQUID COLLECTING AND DIRECTING MEANS

George E. Burks, Peoria, Ill., assignor to Caterpillar Tractor Co., San Leandro, Calif., a corporation of California Application September 1, 1944, Serial No. 552,358

2 Claims. (Cl. 98—60)

The present invention relates to a liquid trap for an exhaust conduit of an internal combustion engine and particularly to a trap for collecting liquid entering the exhaust conduit of the engine and draining it off to prevent it from passing into the engine.

Vertical exhaust pipes are commonly and preferably used on many internal combustion engines such, for example, as the engines of tractors. When such engines are exposed to the weather the moisture entering through the exhaust pipe as a result of rain or snow has detrimental effect on the engine either in causing rust or by its presence preventing proper operation of the engine.

It is, therefore, an object of the present invention to provide a trap of simple construction which will be effective to prevent entry of moisture into an engine without unduly obstructing the free flow of exhaust gases through the exhaust conduit with which it is associated. Further and more specific objects and advantages of the invention are made apparent in the following specification wherein reference is made to the accompanying drawings.

Referring to the drawings:

Figure 1 is a side elevation of a track-type tractor illustrating a rain trap in the exhaust conduit of the track-type tractor;

Figure 2 is an enlarged sectional view showing the coupling means for connecting a section of the exhaust conduit to a plurality of exhaust manifolds;

Figure 3 is an enlarged sectional view of the modification of rain trap shown in Figure 1;

Figure 4 is a horizontal sectional view of the rain trap of Figure 1 taken on line 4—4 of Figure 3;

Figure 5 is an enlarged sectional view of another modification of rain trap showing the rain trap also serving as the coupling between the exhaust conduit and exhaust manifolds;

Figure 6 is a horizontal sectional view taken in a plane indicated by the line 6—6 of Figure 5; and Figure 7 is an enlarged sectional view of still another modification of rain trap between the exhaust conduit and the coupling means for the exhaust manifold.

In Figure 1, I have illustrated one form of the trap of my invention with the exhaust of a vehicle such as a track-type tractor having an engine provided with divided exhaust manifolds communicating with an upright exhaust conduit. While Figure 1 shows two exhaust manifolds, it is to be understood, however, that the trap of this embodiment, as well as the others, may be employed with a single exhaust manifold or any other number of exhaust manifolds discharging into a single exhaust conduit.

The exhaust conduit, in the embodiment disclosed in Figure 1 includes as one of its members a coupling member 10 coupled to divided exhaust manifolds 11 and 12, as more clearly shown in Figure 2, with gasket 13 between the coupling 10 and the divided manifolds 11 and 12, and the member being held assembled in any well-known manner as by bolts or capscrews. One end of an upright pipe 14 is secured to the coupling 10 as by welding and the other end connects into an enlarged sleeve 15 and is secured therein by clamp 16. The enlarged sleeve 15 forms a part of the trap and the sleeve 15 is connected at its upper end to the exhaust extension pipe 17 of smaller diameter than the sleeve 15. The lower end of the exhaust extension pipe 17 extends into the sleeve 15 and has a series of apertures 18. The apertured lower end of the exhaust extension pipe 17 forms a part of the trap mechanism. In this connection, the exhaust extension pipe 17 and the sleeve 15 are preassembled as a unit for mounting on the upright pipe 14. It can be seen that the exhaust conduit conducting the exhaust gases from the engine to the atmosphere comprises the coupling member 10, the upright pipe 14, the sleeve 15, apertures 19 in the lower end of the exhaust extension pipe 17 and the exhaust extension pipe 17. It is noted that the total area of the apertures 19 in the lower end of the exhaust extension pipe 17 is greater than the cross-sectional area of the pipe 17 so there is no obstruction to flow of exhaust gases from the sleeve into the exhaust extension pipe 17 with a cutting down of the efficiency of the engine.

The inner end of the exhaust extension pipe 17 is closed by a plate 20 which with the lower end portion of the pipe 17 forms a water collecting receptacle so that any water flowing down the inside of the pipe 17 will flow onto plate 20. The plate 20 has an aperture 21 therein and a pipe 22 connecting the aperture 21 with the outside of sleeve 15 to conduct any water collected to the outside atmosphere. The exhaust gases entering sleeve 15 from upright pipe 14 encounter deflector 23 supported in the sleeve 15 by means of bracket 24 secured to the inner wall of the sleeve. The deflector 23 guides the exhaust gases to the inner wall of the sleeve 15 and away from the dead end pipe 17 with a minimum of resistance to the flow of the exhaust gases and hence with a minimum loss of efficiency in the engine. The exhaust gases then enter exhaust extension pipe 17 through apertures 19, as previously described, and pass to the atmosphere through the pipe 17.

In some instances, when snow packs in the exhaust extension pipe 17 and melts, or water runs down the inside wall of pipe 17, the water may flow through one or more of the apertures 19 and then down the outside of the pipe 17. A trough member 25 is attached to the outside of the pipe 17 by welding or any other suitable means to form a receiving and directing means for any water which might find its way down the outside of the pipe 17. From the trough 25, the water flows through apertures 26 in the pipe 17 onto the plate 20, thence through opening 21 and pipe 22 to the atmosphere. It can thus be seen that whether water flows down the inside or outside of the pipe 17, a collecting and directing means is ready to receive it and divert its flow away from the engine.

The embodiment shown in Figure 5 is particularly adapted for use with a dual or divided exhaust manifold, and employs the same principles as previously described for Figure 2. The dual exhaust manifolds are again represented by the numerals 11 and 12 and a coupling member 30, containing the trap, connects the exhaust manifolds 11 and 12 with an exhaust extension pipe 31. In this modification the exhaust conduit includes the coupling 30 and the exhaust extension 31. The exhaust extension pipe 31 is secured to one end of the coupling 30 by welding or any other suitable means while at the other end, the exhaust manifolds and the coupling member are held together by capscrews or bolts in a well-known manner with a gasket member therebetween.

In this modification, the liquid collecting portion comprises a trough 32 formed by integral flanges 33 located directly under the exhaust extension 31. As a result any backflow of water through the exhaust extension 31 must fall by gravity into the trough 32. It is to be observed that the periphery of the trough 32 is outside, or larger, than the internal diameter of the exhaust extension 31; hence, any flow of water through the exhaust extension 31 will of necessity have to drop and be caught in the trap 32. Also comparatively wide spaces 35 and 36 exist on each side of the periphery of the trough 32 and the wall of the coupling member 30 so that in effect the water collecting trough is associated with means to provide for substantially unobstructed flow of exhaust gases through the coupling member 30 into the exhaust extension 31 as can be clearly seen from Figure 5. To provide for drainage of water from the trough 32, drain passages 34 are provided between the trough and the outside atmosphere through which any collected water may escape. In this modification the drain passage 34 is shielded by the coupling member 30 from above and the exhaust manifolds 11 and 12 from the side. Further, the coupling 30 is located under the hood of the track-type tractor; hence, it is practically impossible for any water to enter the engine through the drain passage.

The modification shown in Figure 7 also embodies the principles of the previous modifications with this particular structure making provisions for straight through flow of the exhaust gases from the engine without the exhaust gases encountering any obstructions to their flow or being subjected to any change of direction.

The structure of Figure 7 comprises a coupling member 40 connected at one end to the exhaust manifold or manifolds of the engine (not shown) and the other end of the coupling member connected to an upright pipe 41 as by bolts 42 or any other suitable means. An exhaust extension pipe 43 is connected to the upright pipe 41 so that the coupling 40 and pipes 41 and 43 form the exhaust conduit between the engine and the atmosphere. The upright pipe 41 is flared inwardly gradually for a limited distance at its top and discharges directly into the exhaust extension pipe 43. The upper end of the upright pipe 41 with its gradual flare acts as a means to guide the exhaust gases into the exhaust extension pipe 43 with a minimum obstruction to the flow of the exhaust gases in their flow through the different members making up the exhaust conduit.

The exhaust extension pipe 43 is flared outwardly close to its lower end beginning at 44 and continues to flare outwardly until point 45 is reached where the end of the pipe is turned inwardly as at 46. The inner end of the portion 46 is attached by welding or any other suitable means to the upright pipe 41 which leaves a space 47 between the flared lower end of pipe 43 and upright pipe 41 which is the collecting space or trap for water. It is noted that the flared lower end of the pipe 43 is of a larger diameter than the upper end of the upright pipe 41; hence, any flow of water down the inner wall of the pipe 43 will be diverted away from the entrance of pipe 41 and into the collecting space 47. A drain passage 48 connects the space 47 with the atmosphere to drain any water collected outside the trap and away from the engine. This modification is located under the hood of the engine which serves to protect the drain passage 48 against entrance of water.

It can be seen from the above that I have provided a group of water traps which effectively prevent water from entering an engine through the exhaust conduit for the engine.

I claim:

1. A trap for preventing entrance of liquid into an engine exhaust comprising the combination with an upright exhaust conduit of an extension pipe aligned over and spaced from the conduit, a sleeve of larger diameter than the conduit and the extension for coupling them together, said extension pipe having its lower end depending into the sleeve and being perforated for the passage of exhaust gases, a closure plate for the lower end of the extension pipe to trap liquid, and a drain conduit communicating between the inner closed end of the extension pipe and the exterior of the sleeve to conduct trapped liquid to the exterior of the exhaust conduit.

2. A trap for preventing entrance of liquid into an engine exhaust comprising the combination with an upright exhaust conduit of an extension pipe aligned over and spaced from the conduit, a sleeve of larger diameter than the conduit and the extension for coupling them together, said extension pipe having its lower end depending into the sleeve and being perforated for the passage of exhaust gases, a closure plate for the lower end of the extension pipe to trap liquid, a drain conduit communicating between the inner closed end of the extension pipe and the exterior of the sleeve to conduct trapped liquid to the exterior of the exhaust conduit, and a trough member encircling the lower extremity of the extension to collect liquid which flows down its outer surface, and means for directing liquid from the trough into the inner closed end of the extension.

GEORGE E. BURKS.

REFERENCES CITED

The following references are of record in the file of this patent:

UNITED STATES PATENTS

| Number | Name | Date |
|---|---|---|
| 64,816 | Wheeler | May 11, 1867 |
| 223,403 | Stewart | Jan. 6, 1880 |
| 292,760 | Murray | Jan. 29, 1884 |
| 583,600 | Lagen | June 1, 1897 |
| 786,555 | Foster | Apr. 4, 1905 |
| 1,437,222 | Branston | Nov. 28, 1922 |
| 1,606,032 | Kolstrand | Nov. 9, 1926 |
| 1,848,701 | Dibble | Mar. 8, 1932 |
| 1,867,802 | Bogert | July 19, 1932 |
| 1,962,783 | Mitchell | June 12, 1934 |
| 2,057,154 | Lonergan | Oct. 13, 1936 |
| 2,084,338 | Hamblin | June 22, 1937 |
| 2,350,102 | Fairbanks | May 30, 1944 |

FOREIGN PATENTS

| Number | Country | Date |
|---|---|---|
| 3,077 | Great Britain | Feb. 11, 1899 |
| 14,427 | Great Britain | 1890 |